United States Patent [19]
Sandell

[11] 3,729,873
[45] May 1, 1973

[54] ENDLESS FLEXIBLE ABRASIVE BELT HAVING SOLDERED SEAMS AND A METHOD FOR MAKING SUCH SEAMS

[75] Inventor: Torsten Wilhelm Sandell, Markaryd, Sweden

[73] Assignee: Fabriksaktiebolaget Eka, Markaryd, Sweden

[22] Filed: Jan. 14, 1971

[21] Appl. No.: 106,458

[30] Foreign Application Priority Data

Jan. 20, 1970 Sweden ........................................634

[52] U.S. Cl. ........................................51/399, 51/297
[51] Int. Cl. ..........................................B24d 11/00
[58] Field of Search.............................51/399, 297

[56] References Cited

UNITED STATES PATENTS

| | | | |
|---|---|---|---|
| 2,391,731 | 12/1945 | Miller et al. | 51/399 |
| 2,733,181 | 1/1956 | Riedesel | 51/399 X |
| 2,794,726 | 6/1957 | Riedesel et al. | 51/399 X |
| 3,053,020 | 9/1962 | Bratton | 51/399 |
| 3,154,897 | 11/1964 | Howard | 51/399 |
| 3,402,514 | 9/1968 | Johnson | 51/399 |

Primary Examiner—Othell M. Simpson
Attorney—Jacobs & Jacobs

[57] ABSTRACT

An endless flexible abrasive belt is made up from one or more pieces of abrasive sheet material. Abrasive sheet material of the kind referred to comprises a flexible backing member of paper or fabric, one side of which is provided with a coating of abrasive grits. The abrasive grits are anchored to the flexible backing member by one or more layers of glue. In order to form an endless belt the piece or pieces have to be joined at a pair of opposite or at successive edges respectively. The joint between abutting edges is made with thermoplastic resin as a solder so as to form a soldered seam the thickness of which is essentially equal to the thickness of the abrasive sheet material. Fiber reinforced or non-reinforced polyamide is a suitable material for the thermoplastic solder, and results in joints having good flexural and tensile strength.

The soldering operation is simple and comprises the fixing of the edges to be joined in spaced or abutting parallel relation to one another so as to form a narrow channel between the edges and melting thermoplastic resin into the channel to form a solder seam having a thickness which should not exceed the thickness of adjacent portions of the belt, so as to cause no "chatter marks" on a working piece.

2 Claims, 7 Drawing Figures

Patented May 1, 1973 3,729,873

INVENTOR
TORSTEN W. SANDELL
By Jacobs & Jacobs

ENDLESS FLEXIBLE ABRASIVE BELT HAVING SOLDERED SEAMS AND A METHOD FOR MAKING SUCH SEAMS

BACKGROUND OF THE INVENTION

Pieces of abrasive flexible sheet material may be joined to an endless belt by suitable joints. The joints should not be any thicker than adjacent portions of the belt in order to avoid "chatter marks" on a working piece, and for the same reason the abrasive surface should have substantially the same structure about the joint as at other parts of the abrasive belt. Suitable joints are lap joints as well as butt joints.

There is no great problem in making a lap joint strong and flexible, but for several reasons lap joints are not very attractive for the manufacturing of endless abrasive belts. First of all the ends to be joined together have to be cut down to a well-defined taper, which in itself is not very easy, since one end has to be cut down from the abrasive side. The ends have then to be glued, and as a rule this is a neither simple nor quick process. For example contact glues may be used to give a strong bond at moderate pressure and temperature but they require long pre-treatment times. Thermosetting resins on the other hand usually require high temperature or pressure in order to set quickly. These temperatures or pressures may harm the abrasive material by locally changing the structure of the abrasive surface in particular by lowering the surface roughness at the joints. This might cause "chatter marks," and for these and other reasons inventors set out to find another solution to the long-standing problem of making a strong, thin and flexible joint for abrasive belts.

It has been proposed to use thermosetting resins in a butt-joint between pieces of abrasive sheet material, but this method also has some draw-backs. If a thermosetting resin having a reasonable shelf-life is to be used, the curing time will be long or the curing will have to be carried out at high temperature and/or high pressure. This will have a harmful effect on the surface structure of the usual types of abrasive sheet material. The idea of using a butt-joint has, however, certain advantages, since the cutting of co-operating abutting edges is very much simpler than for a lap-joint, and both cooperating ends may be cut from the non-abrasive side.

It is therefor an object of the present invention to provide an endless flexible abrasive belt made from one or more pieces of abrasive sheet material, in which the joint or joints are of the butt-joint type, and where the joints are thin, strong and flexible.

It is a further object of the invention to provide a method for making such an endless, flexible belt having strong, thin and flexible butt-joints.

These and other objects of the invention, as well as the scope, nature and utilization of the invention will be apparent from the following detailed description and appended claims.

SUMMARY OF THE INVENTION

It has been found that improved joints in an endless flexible abrasive belt made from one or more pieces of abrasive sheet material of the kind comprising a flexible backing member of paper or fabric, one side of which is provided with a coating of abrasive grits, and where the pieces are joined at abutting edges to form together said endless belt, may be obtained by making said joints in the form of soldered seams of a thermoplastic resin, and making the seams essentially as thick as the abrasive sheet material.

DETAILED DESCRIPTION OF THE INVENTION

The invention will now be described with reference to the accompanying drawings showing some embodiments of the invention to which embodiments, however, the invention is not limited.

Figure 1:
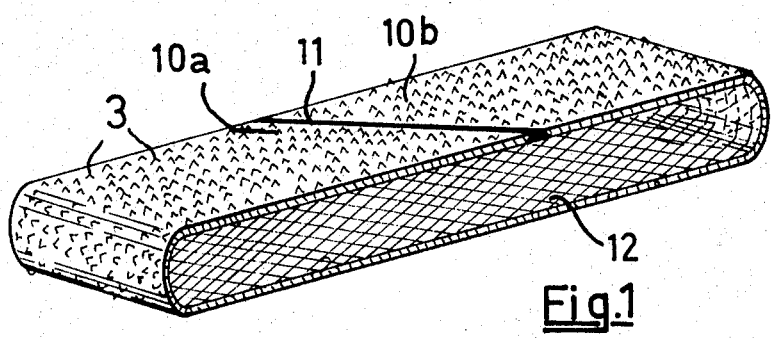
Figure 2:
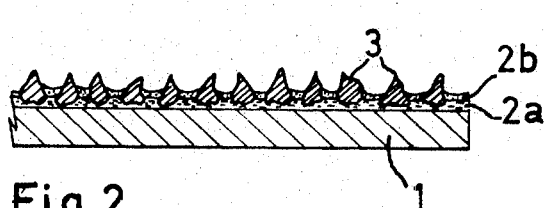

In the drawing FIG. 1 is a perspective view of an abrasive belt according to the invention shown in the shape which the belt assumes in use. FIG. 2 is a cut through a part of an abrasive belt. FIG. 3 is a longitudinal cut through a first embodiment of a joint according to the invention where the respective ends are essentially parallel. FIG. 3b is a similar cut through a second embodiment of a joint according to the invention where the edges are tapered from the backside. FIG. 3c shows a similar cut through a third embodiment of the invention where the edges have been cut to rectangular cross section, and FIG. 3d and 3e respectively show similar cuts through a fourth and fifth embodiment of the invention.

The endless abrasive flexible belt shown in FIG. 1 comprises a backing member 12 of paper, fabric such as cotton cloth or a combination thereof. Opposite edges 10a and 10b of the backing member 12 are joined together at a joint 11. The joint 11 normally forms an angle of 45° with respect to the longitudinal direction of the belt. The value of this angle, however, is not essential to the invention. An endless abrasive belt may of course also be made up from several successive transverse strips, in particular if the belt is to have large width.

FIG. 2 is a cross section of an abrasive article of the kind referred to comprising a flexible backing member 1 made from a suitable fabric or paper. On one side of the backing member the abrasive grits 3 are anchored in layers 2a and 2b of glue.

The problem to which the present invention is a solution consists essentially in providing a strong, thin and flexible joint between the edges of such sheet material without changing the structure of the abrading surface.

Figure 3A:
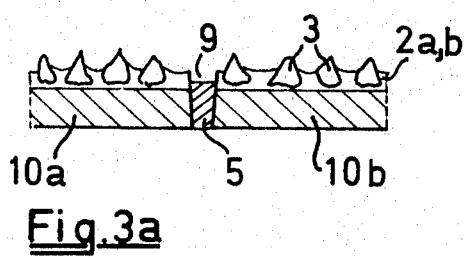
Figure 3B:
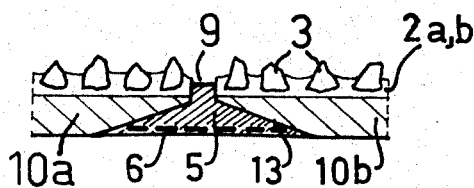
Figure 3C:
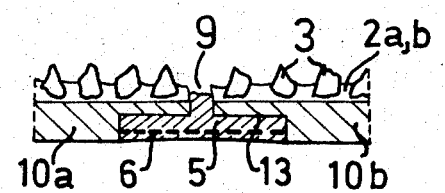

FIG. 3a shows the ends 10a and 10b respectively being parallel and situated some distance from each other, for example a distance of from 0.5 to 1 millimeter or more leaving a space 9 between adjacent ends. The space or channel 9 is filled with a suitable thermoplastic resin 5 in a manner which will be further described below.

Polyamid, in particular NYLON, has proved particularly suitable as a material for the joints. Those characteristics of the polyamides which are considered most important for the invention are their good thermal resistance, their comparatively high and well defined melting point, their low viscosity when melted and their combination of high tensile and good flexural strength at ambient and elevated temperatures.

A joint according to the invention may be obtained in the following manner. The edges 10a and 10b of a strip 12 of flexible abrasive sheet material are cut to suitable shape and the edges are temporarily fixed with respect to one another with a suitable space or channel 9 between them. The thermoplastic resin, in particular a polyamid, is then melted into the joint. The joining does not require any compressive force at all and may be made simply by melting a wire or strip of the joint material into the space, for example by means of a heated shoe or roller and using a subsequent cold shoe or roller in order to cool the material rapidly. The soldering is carried out from the backside of the abrasive sheet material and may be effected very rapidly and is therefor particularly suited for high-speed automatic manufacture.

Contrary to previous joints serving similar purposes which all have used glues or adhesives, the joint according to the invention is more of a soldered seam where the solder is a thermoplastic resin, in particular a polyamide.

FIG. 3b shows a second embodiment of the invention where the edges 10a and 10b are shaped so as to form a space having an essentially V-shaped cross section. The figure is not drawn to scale and the maximum width of the V-shaped space may be from 5 to 50, preferably from 10 to 20 times the thickness of the abrasive sheet material. The edges may be cut and shaped in one operation by means of a suitable cutting and abrading wheel. In the embodiment shown in FIG. 3b the thermoplastic resin 5 is reinforced with a strip 6 of glass-fiber fabric or similar suitable material. The fiber material 6 may either initially be part of the thermoplastic resin solder or it may be added to the joint in the soldering operation.

FIG. 3c shows an embodiment which only differs from the embodiment according to FIG. 3b in the respect that the solder channel has a rectangular cross section. Also this joint may or may not be provided with a reinforcing material 6 of glassfiber fabric or similar suitable material.

Figure 3D:
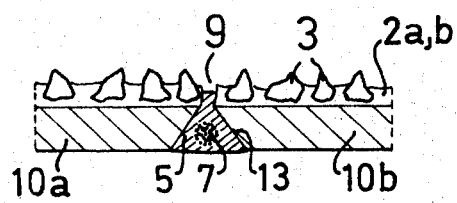

FIG. 3d shows a further embodiment of a joint according to the invention having a comparatively narrow V-shaped channel the largest width of which may be from 1 to 10–30 times the thickness of the base material. The joint is reinforced by one or more strings 7 of loosely twined fiber yarn for example glass fiber or some other suitable fiber. The string or strings 7 are placed in the longitudinal direction of the joint and may either be part of the solder or incorporated in the joint during the soldering operation.

Figure 3E:
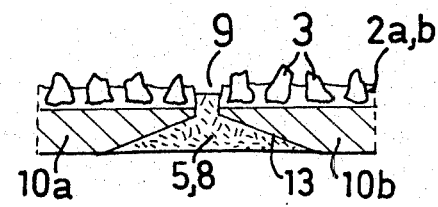

FIG. 3e, finally, shows a joint having essentially the same shape as the joint shown in FIG. 3b but having the thermoplastic resin 5 intermixed with comparatively short, essentially randomly orientated reinforcement fibers 8.

An endless abrasive belt according to the invention may be made essentially in the following manner.

One starts with a single-sided abrasive flexible sheet material the base member 1 of which may be of for example a suitable paper or fabric. The sheet material is cut to the desired length and width. The ends 10a and 10b of such a strip of flexible abrasive sheet material are tapered from the backside to a suitable shape so that the tapered portions 13 of the respective ends are parallel to each other and form a narrow channel for the folder. The ends are then temporary fixed with respect to each other in a suitable tool and, depending on the shape of the taper and the intended joint, the respective edges may either abut against each other or leave a channel 9 which may be about 1 or 2 millimeters wide. It is, however, not necessary to taper the edges to the shapes shown here and the actual shape and distance between the edges will be determined by the desired strength and other properties which have little connection with the manufacturing method according to the invention. It is sufficient that the edges are positioned some distance from each other and that the space or channel between the edges 10a and 10b be filled with molten thermoplastic resin in sufficient amount and in such a way that the space is completely filled and also in such a manner that the joint will have essentially the same thickness as the abrasive sheet material.

Preferably the molten thermoplastic resin is then immediately cooled either by dissipation or convection for example by means of an air-cooled roller or shoe.

For most purposes the thermoplastic resin itself will have sufficient strength, in particular if the thermoplast is a polyamid, but in some applications it has proved suitable to use a fiber reinforcement. The reinforcement may be either woven bands 6 having approximately the same width as the joint or it may be loosely twined yarn 7 completely surrounded by the thermoplastic material 5. Also comparatively short fibers may be mixed into the molten plastic material to such an amount that the desired strength and resilience is obtained. In particular it should be realized that the reinforcing material either may be admixed to the thermoplastic resin when the joint is formed or it may have been previously included in the solder of thermoplastic resin.

It should also be realized that the invention is not limited to the embodiments described, and that there may be other configurations of the edges of the joint or other techniques for making such soldered joints, which may be particularly adapted to some specific requirements, and that such modifications or improvements which would be or become obvious to a person skilled in the art in the light of the above disclosure also are intended to be included in the scope of the following claims.

What I claim is

1. In an endless flexible abrasive belt of flexible paper or fabric coated on one side with abrasive grits and joined at abutting edges the improvement characterized in that the sole joint between said abutting edges consists of a seam of fused noncompressed thermoplastic polyamide having a tensile strength of from about 600 to about 750 kp/cm$^2$ and a flexural strength of from about 800 to about 1100 kp/cm$^2$, said polyamide being fused to a thickness substantially equal to the thickness of the belt.

2. An endless flexible abrasive belt as claimed in claim 1 in which said fused seam is reinforced with fiber in said fused polyamide aligned in the seam's longitudinal direction.

* * * * *